US008674984B2

(12) United States Patent
Ran et al.

(10) Patent No.: US 8,674,984 B2
(45) Date of Patent: Mar. 18, 2014

(54) METHOD FOR GENERATING A HEX-DOMINANT MESH OF A GEOMETRICALLY COMPLEX BASIN

(75) Inventors: Longmin Ran, Rueil-Malmaison (FR);
Abdallah Benali, Suresnes (FR);
Houman Borouchaki, Paris (FR);
Chakib Bennis, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 410 days.

(21) Appl. No.: 13/178,539

(22) Filed: Jul. 8, 2011

(65) Prior Publication Data
US 2012/0026167 A1   Feb. 2, 2012

(30) Foreign Application Priority Data
Jul. 16, 2010   (FR) ...................... 10 03001

(51) Int. Cl.
*G06T 17/00* (2006.01)
(52) U.S. Cl.
USPC .............. 345/420; 345/419; 345/423; 703/10
(58) Field of Classification Search
USPC ............................................ 345/420; 703/10
See application file for complete search history.

(56) References Cited

U.S. PATENT DOCUMENTS

| | | | | |
|---|---|---|---|---|
| 5,740,342 | A * | 4/1998 | Kocberber | 345/420 |
| 5,844,564 | A | 12/1998 | Bennis et al. | |
| 6,300,958 | B1 * | 10/2001 | Mallet | 345/442 |
| 7,634,395 | B2 * | 12/2009 | Flandrin et al. | 703/10 |
| 8,150,663 | B2 * | 4/2012 | Mallet | 345/423 |
| 8,212,814 | B2 * | 7/2012 | Branets et al. | 345/423 |
| 8,315,845 | B2 * | 11/2012 | Lepage | 703/6 |
| 8,339,396 | B2 * | 12/2012 | Williams et al. | 703/10 |
| 2012/0215513 | A1 * | 8/2012 | Branets et al. | 703/10 |

FOREIGN PATENT DOCUMENTS

| | | |
|---|---|---|
| FR | 2 747 490 | 10/1997 |
| GB | 801364 | 9/1958 |

OTHER PUBLICATIONS

Heinemann, Z.E. et al: SPE 48998, "Modeling Heavily Faulted Reservoirs", Proceedings of SPE Annual Technical Conferences, pp. 9-19, New Orleans, Louisiana, Sep. 1998. SPE.

(Continued)

*Primary Examiner* — Hau Nguyen
*Assistant Examiner* — Ryan M Gray
(74) *Attorney, Agent, or Firm* — Antonelli, Terry, Stout & Kraus, LLP.

(57) ABSTRACT

A method for generating a mesh of a subterranean medium comprising at least one sedimentary layer crossed by at least one fault. The at least one layer is delimited vertically by two geological horizons discretized by two triangulated three-dimensional surfaces. For each horizon, a three-dimensional gridded surface is constructed by means of isometric unfolding accounting for the presence of the fault. Next, the mesh of the subterranean medium is generated by generating cells by creating links between the three-dimensional gridded surfaces. To do this, nodes of the first gridded surface that are situated on one side of the fault which differs from the side of a node of the second gridded surface having the same coordinates i, j are detected. Each non-detected node is joined with a node of the second gridded surface having the same coordinates i, j, and each detected node is joined with the fault by considering a direction of a neighboring node. Finally, the cells having at least two vertices in common are regularized.

47 Claims, 11 Drawing Sheets

(56) References Cited

OTHER PUBLICATIONS

Longmin Ran et al: "Hex-dominant Mesh Generation for Basin Modeling with Complex Geometry", WCCM/APCOM, vol. 10, Jul. 5, 2010, pp. 1-10, XP007918465, IOP Conference Series: Materials Science and Engineering, IOP Publishing, GB ISSN: 1757-8981, DOI:10.1088/1757-899X/10/1/012085.

K. T. Chambers, et al: "Geologic Modeling, Upscaling and Simulation of Faulted Reservoirrs Using Stratigraphic Grids", Proceedings of the SPE Reservoir Simulation Symposium, XX, XX. No. 51889, Feb. 14, 1999, pp. 1-12, XP002215912.

C. Bennis et al: "One more Step in GOCAD Stratigraphic Grid Generation: Taking Into Account Faults and Pinchouts", Proceedings of the NPF/SPE European 3-D Reservoir Modelling Conference, XX, XX, Apr. 16, 1996, pp. 307-316, XP000613094.

E. Gringartent et al: "New Grids for Robust Reservoir Modeling" SPE Annual Technical Conference and Exhibition, ATCE 2008: Sep. 21-24, 2008, Denver, Colorado, USA/Society of Petroleum Engineers, Red Hook, NY, US, No. SPE 116649, Sep. 21, 2008, pp. 1-11, XP002568350.

Jayr Stanislas et al: "The Need for a Correct Geological Modelling Support: the Advent of the UVT-Transform", First Break, European Association of Geoscientists and Engineers, Houten, NL, vol. 26, Oct. 1, 2008, pp. 73-79, XP002568352, ISSN: 0263-5046.

\* cited by examiner

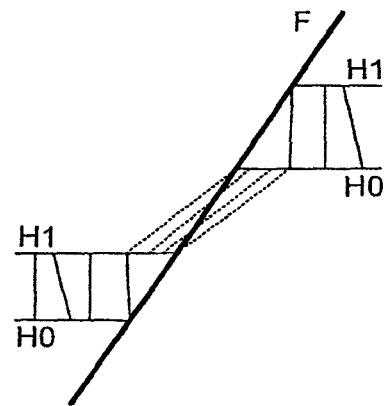
Fig. 14
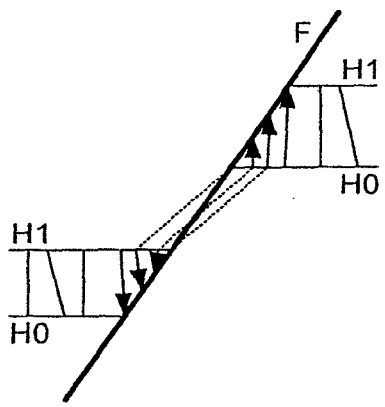
Fig. 15
Fig. 16

METHOD FOR GENERATING A HEX-DOMINANT MESH OF A GEOMETRICALLY COMPLEX BASIN

BACKGROUND OF THE INVENTION

1. Field of the Invention

The present invention relates to the field of oil exploration, and more particularly to the study of the geological history of oil systems, within a sedimentary basin.

2. Description of the Prior Art

Basin modeling attempts to reconstruct the geological history of a sedimentary basin and of its oil systems so as to help to locate hydrocarbon traps, that is reservoirs, to estimate their quantity and quality, and finally, to evaluate the risks of encountering excess pressures during drilling operations. These objectives are achieved by studying the burial history of sediments, their thermal history, the kinetics of the formation of the hydrocarbons, and the migration (flow) of the hydrocarbons.

Such a study is carried out by means of two types of tools: on the one hand software, called a basin simulator, makes it possible to solve systems of ordinary or partial differential equations solved by various numerical schemes; and on the other hand a dynamic mesh describing the geometrical evolution of the basin concerned, and on which the systems of equations are solved.

Today, exploration is involved with zones of complex geometry where the faults are numerous and their location random. The automatic construction of a 3D mesh capable of representing this geometrical complexity is the first indispensable step in the formulation of a representation of such a medium, on the basis of horizons which delimit the various geological layers and faults which cut the horizons. The horizons and the faults are provided as surfaces, triangulated on the basis of a scattering of points resulting from seismic surveys.

In the world of oil exploration, most basin simulators operate on regular or "Scottish Cartesian" meshes. To attempt to adapt the meshes to the faults and to all forms of heterogeneities, as a support for the calculation of the simulation, the technique of local grid refinement is known, the technique of CPG grids (described in document FR 2 747 490 for example), or else the technique of grids with vertically split nodes is used.

The meshes described above are based on grids. They are nearly structured. That is to say their inter-vertex relation is fixed. Each internal vertex is incident at a fixed number of mesh cells and each mesh cell is delimited by a fixed number of faces and edges. They are thus suitable only for a relatively simple geometry. For a basin simulator, such as the TemisFlow® software (IFP, France), for each given age, a mesh is constructed by stacking layers, represented on one and the same 2D grid (map), which are joined by verticals. The construction of the mesh is very simple but however, it is impossible to represent faults which are often oblique.

To be able to handle faults, there are methods which first perform a manual blockwise decomposition following faults, and then generate a simple mesh for each block. Such is the case for the RML® software (IFP, France). This approach is, however, not completely suitable for the simulation of flow in a medium with complex geometry for two reasons: First, the quality of elements is not satisfactory for irregular geometries; and second, with the numerous and random presence of faults, it is almost impossible to perform the manual decomposition of the involved medium.

To properly reproduce all the complexity of the geometry of the medium, it is also possible to construct an entirely unstructured mesh, with a completely arbitrary inter-vertex relation. A vertex of the mesh can belong to any number of mesh cells and each mesh cell can possess any number of edges or faces. References may be made for example to the meshes of the PErpendicular Bisector (PEBI) or Voronï type, proposed in:

Z. E. Heinemann, G. F. Heinemann and B. M. Tranta, "Modelling Heavily Faulted Reservoirs", Proceedings of SPE Annual Technical Conferences, pages 9-19, New Orleans, La., September 1998, SPE.

Although they describe complex geometries well, unstructured meshes are very unwieldy to construct, to manipulate and to store, in contradistinction to structured meshes. To reconcile between the advantages and drawbacks, so-called "hybrid" approaches have been proposed which use unstructured meshes only in zones of complex geometry. Nevertheless, placing unstructured meshes together with structured meshes remains a difficult task.

In the general literature, four major categories of method exist for automatically generating hex-dominant meshes. They are:
the octree/grid methods,
the plastering methods,
the blockwise methods,
the sweep-based methods.

The principle of octree/grid methods wraps the domain to be meshed in a grid, and subdivides this cube recursively until the geometry of the domain is well captured. That is to say, until the criterion of the size of the mesh cells, which depends essentially on the minimum distance of the points of the contour and resources available, are fulfilled. Tetrahedral or hexahedral elements are then created at the intersection of the surfaces of the domain by following certain intersection patterns.

The octree/grid methods are advantageously automated and applicable regardless of the geometry. However, the generated mesh does not conform to the shape of the domain. Moreover, when the contour is irregular, an intense calculation of intersections is inevitable and an explosion in the number of mesh cells could occur in order to attain a good accuracy of approximation of the boundaries.

The methods of plastering type fill the volume of the domain with 3D elements starting from the initial surface front of the model and advancing towards the center while starting again from the new front which has just been constructed. The procedure terminates once the front becomes empty.

In plastering algorithms, it is difficult to determine the orders of advance of the front and to detect and process the collision and divergence zones. These methods are thus considered to be non-robust. Especially when complex geometries are concerned, the obtaining of a mesh of good quality is not guaranteed.

The blockwise approaches decompose the domain into coarse blocks having an elementary inter-vertex relation (triangle, quadrangle, tetrahedron, pentahedron, and hexahedron), and then in meshing each block independently of one another by algebraic methods or by solving PDEs and in connecting the blocks back together at the end in order to form the global mesh of the entire domain.

The major advantage of block methods is that it is trivial to mesh once the partition is completed. Moreover, it is possible to solve the problem in parallel on each block. However, the partition itself remains very unwieldy and difficult to automate, and the inter-block interfacing must be carefully handled to ensure the conformity of the final sticking together.

Sometimes considered as 2.5D meshing, the sweep-based methods "sweep" a quadrilateral mesh by following a curve. Regular layers of hexahedra are formed at a specified interval using the same inter-vertex relation as the quadrilateral mesh. This technique can be generalized to mesh volumes of certain classes by definition of the source and target surfaces.

The meshes generated by the sweep methods are automatically aligned with the interfaces which is obviously a major advantage. However, these methods are not well suited in the context of simulating a porous medium, where a change of inter-vertex relation may occur from one horizon surface to another on account of the occurrence of faults.

SUMMARY OF THE INVENTION

The invention relates to an alternative method for generating a three-dimensional mesh of a basin, that may or may not evolve, which circumvents the problems of the earlier techniques for handling the presence of faults in three dimensions. The method is based on the creation of a hex-dominant mesh coupled with a method of detecting cells affected by faults, consideration of the fault for these cells, and regularization of these cells processed in the case of degeneracy.

Thus, the invention relates to a method for generating a mesh of a subterranean medium comprising at least one sedimentary layer crossed by at least one fault. The layer is delimited vertically by two geological horizons discretized by two triangulated three-dimensional surfaces.

The method comprises the following steps:
 i. each three-dimensional surface is transformed into a regular two-dimensional grid by a technique of isometric unfolding accounting for the fault, and by preserving the same number of quadrilaterals in each direction for each grid;
 ii. each regular grid is transformed into a three-dimensional gridded surface, and each quadrilateral crossed by the fault at the level of a diagonal is transformed into two triangles, each gridded surface thus comprises a set of triangular and quadrilateral surface elements;
 iii. the mesh of the subterranean medium is generated by generating cells by creating links between nodes of the surface elements of the two three-dimensional gridded surfaces:
   by detecting nodes of the first gridded surface that are situated on one side of the fault different from the side of a node of the second gridded surface having like coordinates i, j;
   by joining each undetected node of the first gridded surface with a node of the second gridded surface having like coordinates i, j;
   by joining each detected node of the first gridded surface with the fault by considering a direction of a neighboring node; and
   by regularizing cells having at least two vertices in common.

According to the invention, the step of detecting nodes can be carried out by constructing a chart of a lattice on which a closed trace of the fault is superimposed, the closed trace corresponding to the traces of the fault on each of the gridded surfaces, and the nodes to be joined which are present in the closed trace are detected.

According to the invention, cells are regularized by the following steps:
 for cells created in order to connect a surface element on a fault:
   when the cell is a hexahedron, possessing only seven vertices, the cell is split into two tetrahedra and four pyramids by connecting the center of the cell with its six faces;
   when the cell is a hexahedron, possessing only six vertices, the cell is replaced with a prism;
   when the cell is a prism, possessing only five vertices, the cell is replaced with a pyramid;
   when the cell is a prism, possessing only four vertices, the cell is replaced with a tetrahedron.
 for cells created in order to connect two triangles with a quadrilateral, when the cell is a prism possessing only four vertices, the prism is replaced with a tetrahedron, then for each neighboring element, its center is joined with each of its faces, one of which is divided into two triangles by one of its diagonals.

According to one embodiment, the mesh is able to evolve, and it is modified so as to account for a deposition of a new sedimentary layer in the course of a subsequent geological time, by defining a path of evolution of the nodes at the apex of the medium, and by deforming the mesh according to the path of evolution.

The fault can be accounted for within the regular grid, by carrying out the following steps:
 each triangulated three-dimensional surface is transformed into a triangulated two-dimensional surface on which the fault is projected, by the technique of isometric unfolding, the projected fault thus forming segments describing an open line;
 a first edge of the grid intersected by the open line is determined by scanning the line, segment by segment, starting from one end of the open line;
 the end of the intersected edge closest to the point of intersection is displaced towards the point of intersection.

If the medium comprises several faults, the faults are accounted for within a regular grid, by carrying out the following steps:
 a first edge of the grid, intersected by the open line, is determined by scanning the line, segment by segment, starting from one end of the open line;
 the end of the edge closest to the point of intersection is displaced towards the point of intersection if the displacement does not generate a quadrilateral with at least one angle being greater than a fixed angle threshold, and if this end has not already been displaced; otherwise
 the other end is displaced to the point of intersection if this end has not already been displaced; otherwise
 the mesh is refined, until an end can be displaced, and this end is displaced.

To refine the mesh it is possible to carry out the following steps:
 a new node is added to the mesh, corresponding to a point of intersection between a fault and the edge for which no end can be displaced;
 if the edge is vertical, the complete row of the grid containing the point of intersection is split, by adding a succession of horizontal edges, in all the quadrilaterals of the row, the succession of edges passing through the point of intersection;
 if the edge is horizontal, the complete column of the grid containing the point of intersection is split, by adding a succession of vertical edges, in all the quadrilaterals of the column, the succession of edges passing through the point of intersection.

According to the invention, the regular grid can be transformed into a three-dimensional gridded surface by carrying out the following steps:

for each node not situated on a fault, the coordinates thereof are determined on the basis of barycentric coordinates of the node in a reference frame defined by a triangle of the 2D triangulated surface to which it belongs;

for each node situated on a fault, its coordinates are determined on the basis of curvilinear abscissae measured on the fault;

connectivities between the nodes are established in such a way as to maximize a number of quadrilaterals, only quadrilaterals for which a fault passes through one of its diagonals are divided into two triangles.

Finally, the invention also relates to a method of exploiting a subterranean medium, in which a mesh of the medium is generated by the method according to the invention, at least one flow simulation is carried out by means of software, such as a basin simulator, by utilizing the mesh, and the simulation is used to define an exploitation scheme for the medium, and the exploitation scheme is implemented.

Other characteristics and advantages of the method according to the invention will become apparent on reading the following description of nonlimiting exemplary embodiments, while referring to the appended figures described hereinbelow.

BRIEF DESCRIPTION OF THE DRAWINGS

FIGS. 13 and 14 show the problem of matching two horizons in a faulted zone.

FIG. 15 shows the solution to the above problem.

FIG. 16 shows the chart defining the faulted zone.

DETAILED DESCRIPTION OF THE INVENTION

The method according to the invention IS a technique for retracing, in accordance with the numerical schemes defined, the history of the formation of the oil systems in a sedimentary basin of complex geometry in the presence of faults, on the basis of a mesh of the basin. The basin comprises at least one sedimentary layer crossed by at least one fault. A sedimentary layer is delimited vertically by two geological horizons discretized by two triangulated three-dimensional surfaces. The method comprises the following steps:

i. each three-dimensional surface is transformed into a regular two-dimensional grid by isometric unfolding accounting for the fault, and by preserving the same number of quadrilaterals in each direction for each grid;

ii. each regular grid is transformed into a three-dimensional gridded surface, and each quadrilateral crossed by the fault at the level of a diagonal is transformed into two triangles, each gridded surface thus comprising a set of triangular and quadrilateral surface elements;

iii. the mesh of the subterranean medium is generated by generating cells by creating links between nodes of the surface elements of the two three-dimensional gridded surfaces:

by detecting nodes of the first gridded surface that are situated on one side of the fault different from the side of a node of the second gridded surface having like coordinates i, j;

by joining each undetected node of the first gridded surface with a node of the second gridded surface having like coordinates i, j;

by joining each detected node of the first gridded surface with the fault by considering a direction of a neighboring node; and by regularizing cells having at least two vertices in common.

1. Step of Isometric Unfolding

Figure 7:
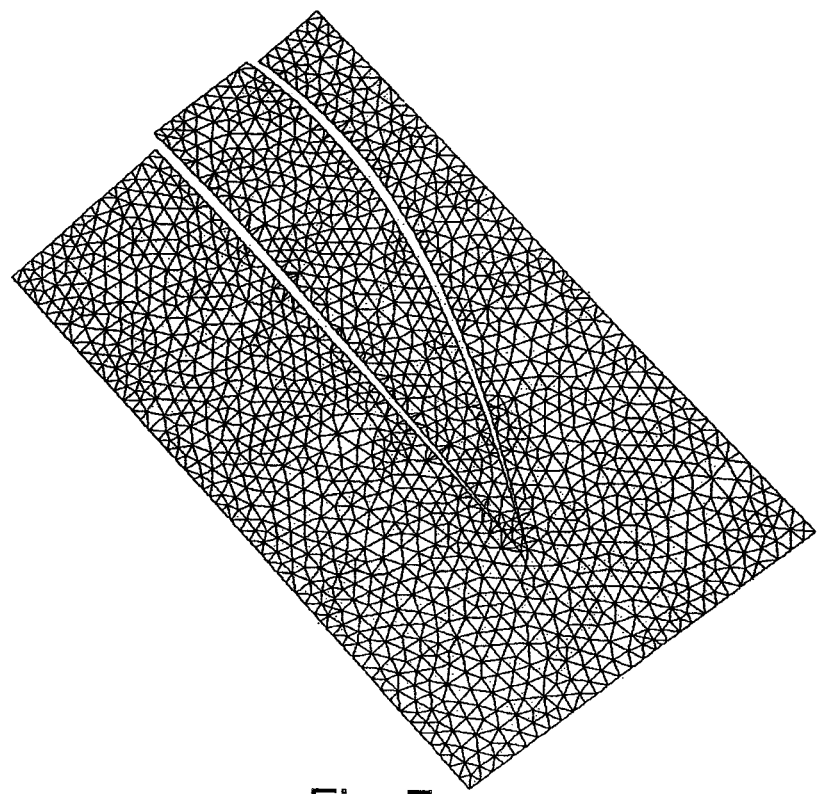
FIG. 7 shows a triangulated 3D real horizon.
Figure 8:
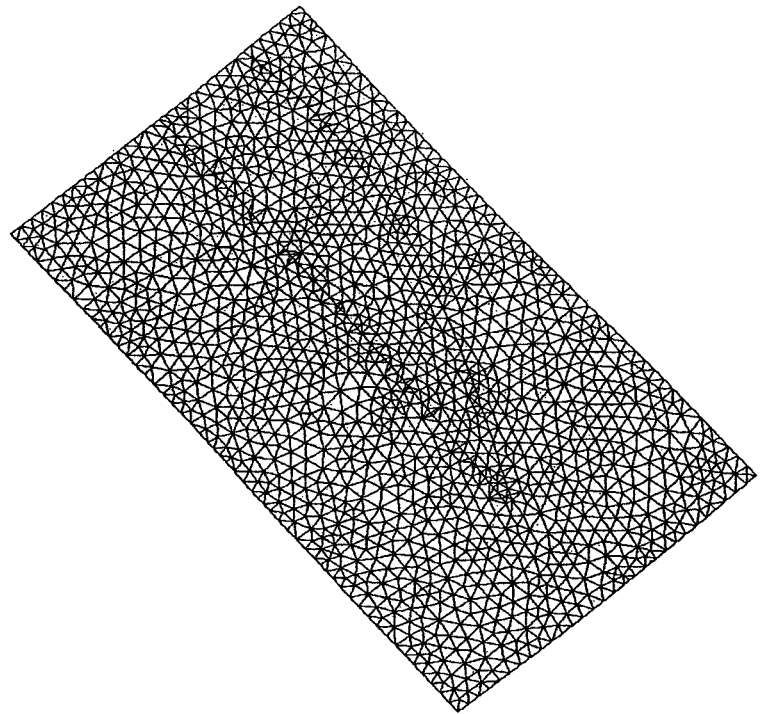
FIG. 8 shows the same horizon unfolded.

This step unfolds in an isometric manner a triangulated 3D surface (such as represented in FIG. 7) in such a way as to obtain a triangulated 2D surface (such as represented in FIG. 8). This step makes it possible to sew the tears in the faults present on the triangulated 3D surfaces.

The term "unfolding" refers to a transformation of a 3D surface into a 2D surface (operation consisting in laying a surface flat). This transformation is "isometric" when it preserves measurements such as the area of the triangle, the length of the edges, etc.

Specialists are aware of tools and methods for carrying out isometric unfolding of a surface. The method according to the invention does not depend on the type of method.

2. Gridding Step

This step generates a regular 2D grid starting from the border of the triangulated 2D surface. The term "grid" refers to a plane canvas (set of principal lines and points of a figure) having two families of perpendicular straight lines delimiting squares.

This regular grid is generated by the following steps:

four points are chosen on the border of the triangulated 2D surface, thus defining four curves on the border, called boundary curves, joining these four points. These four points are preferably those at the level of which the border forms the smallest angles. They are called "corners".

the dimensions of the grid are chosen (two integers denoted N and M), and each of the four curves is alternately discretized as a function of these dimensions. For all the grids, a corner is matched and the boundary curves are oriented in such a way that the domain (the geometrical shape to be meshed) lies on the left. This step serves to orient all the horizons in the same way so as to facilitate the subsequent step of matching the horizons. Next, the boundary curves are subdivided into N or M segments of constant length, N and M being the same as the grid below.

the discretized version of Coons' formula is applied in order to construct the regular grid based on the unfolded horizon (triangulated 2D surface).

Coons' formula is described as follows:

Given four parametric curves $f1(u)$, $f2(u)$, $g1(v)$, $g2(v)$, ($0 \leq u, v \leq 1$) defining four adjoining edges, Coons' formula calculates the tightest surface which passes through the four edges (which interpolates these edges):

$$S(u,v) = (1-u)g1(v) + ug2(v) + (1-v)f1(u) + vf2(u) - $$
$$[(1-u)(1-v)P(0,0) + ((1-u)vP(0,1) + u(1-v)P(1,0) + uvP(1,1)]$$

The vertices $P(i,j)$ are the four corners of the surface.

It is then possible to obtain a regular N×M mesh of this surface by simple sampling, taking as vertices the points $S(i,j)$ corresponding to $ui=i/(N-1)$, $vj=j/(M-1)$, $i=0$ to $N-1$, $j=0$ to $M-1$. The formula restricted to the points of the mesh becomes:

$$S(i,j) = \left(1 - \frac{i}{N-1}\right)g1(j) + \frac{i}{N-1}g2(j) + \left(1 - \frac{j}{M-1}\right)f1(i) + \frac{j}{M-1}f2$$
$$(i) - \left[\left(1 - \frac{i}{N-1}\right)\left(1 - \frac{j}{M-1}\right)P(0,0) + \left(1 - \frac{i}{N-1}\right)\frac{j}{M-1}P(0,1) + \right.$$
$$\left. \frac{i}{N-1}\left(1 - \frac{j}{M-1}\right)P(1,0) + \frac{i}{N-1}\frac{j}{M-1}P(1,1)\right]$$

3. Step of Fitting the Faults on the Grid

Accounting for a fault requires deforming the mesh in such a way that it conforms to the reality of the subterranean medium to be meshed. Indeed, if a fault crosses a medium, generally the sedimentary layers of this medium are broken and deformed. The mesh must therefore account for these deformations induced by the faults.

Case of a Single Fault

In the course of this step, the fault is taken accounted for within the regular grid by carrying out the following steps:
- a first edge of the grid intersected by the open curve is determined by scanning this curve, segment by segment, starting from one of its ends;
- the end of the intersected edge closest to the point of intersection is displaced towards the point of intersection.

Figure 1:
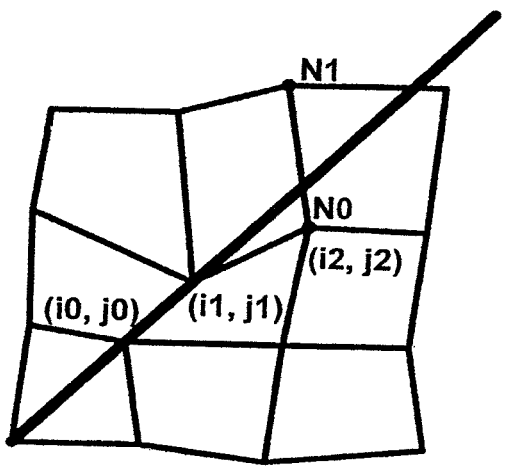
FIG. 1 shows the detection of a degenerate quadrilateral.

A difficulty may occur due to the fact that degenerate quadrilaterals may be produced when shifting this end. This problem is illustrated in FIG. 1:

Consider three nodes such that:
- (i2, j2) is the node to be shifted;
- (i1, j1) is the node shifted just before (i2, j2); and
- (i0, j0) is the node shifted just before (i1, j1).

If (i0=i1 or j0=j1) then (i0, j0) and (i1, j1) form an edge (two successively shifted nodes form either a diagonal or an edge of a quadrilateral). Likewise, (i1, j1) and (i2, j2) form a second edge if we have (i1=i2 or j1=j2). Consequently, these two constructed edges will be in the same quadrilateral if |i0-i2|=1 and |j0-j2|=1 and will be considered to be aligned if the angle between them exceeds a certain alignment threshold. This situation is not acceptable since the hexahedra having this quadrilateral as face will be twisted. To overcome this difficulty, before displacing the closest end, a determination is made to verify that this displacement does not give rise to a degenerate quadrilateral. A quadrilateral is described as being "degenerate" if at least one angle is greater than a fixed angle threshold. Indeed, if displacing the closest end gives rise to such a quadrilateral, then the other end of the intersected edge is displaced. According to the example of FIG. 1, the other end of the edge intersected by the fault is displaced instead of (i2, j2).

Since the method is implemented by a computer, the algorithm relating to this step is described. The algorithm commences with the identification of the quadrilateral which contains the first point of the fault. Next, the intersection between the first segment of the fault and the edges of this quadrilateral is calculated. If no intersection is detected, processing proceeds to the next segment of the fault and looping proceeds until an intersection is found. Thereafter, the end of the intersected edge closest to the point of intersection is shifted towards the latter. If this results in the formation of a degenerate quadrilateral, it is the other end of the edge which is shifted. To calculate the following intersection, advancing through the quadrilaterals having the last node partnered in common occurs while excluding those which have the last two nodes partnered such as a diagonal or an edge. If there is no longer any intersection between the current segment and the quadrilaterals to be visited, then the quadrilaterals to be visited are reassigned with what is contained in the extremity of the current segment, and processing proceeds to the next segment to calculate the intersection, and so on and so forth. Finally, the two extremities of the fault are fitted with the closest nodes. By way of illustration, the algorithm may thus be described:

```
SegmentFault ← 0;
q ← the quadrilateral containing the first point of the fault;
quadsToBeVisited ← q;
quadsToBeExcluded ← zero;
while segmentFault < total number of fault segments
    calculate the intersection of the segmentFault with the
quadsToBeVisited while excluding the quadsToBeExcluded;
    n ← the appropriate end of the intersected edge;
    if n! = −1 then
        quadsToBeExcluded ← the quadrilaterals having n and last
partner nodes as edge/diagonal;
        quadsToBeVisited ← the four quadrilaterals having n in
common;
    else
        quadsToBeVisited ← the quadrilateral in which the second
end of the segmentFault lies;
        quadsToBeExcluded ← zero;
        segmentFault ← segmentFault +1;
    end if
end while
partnering the first point of the fault with the closest corner of q;
for each quadrilateral in quadsToBeVisited do
    if the last point of the fault is in quadrilateral then
        partner the last point of the fault with the closest corner of
the quadrilateral;
        return;
    end if
end for
```

Figure 2:
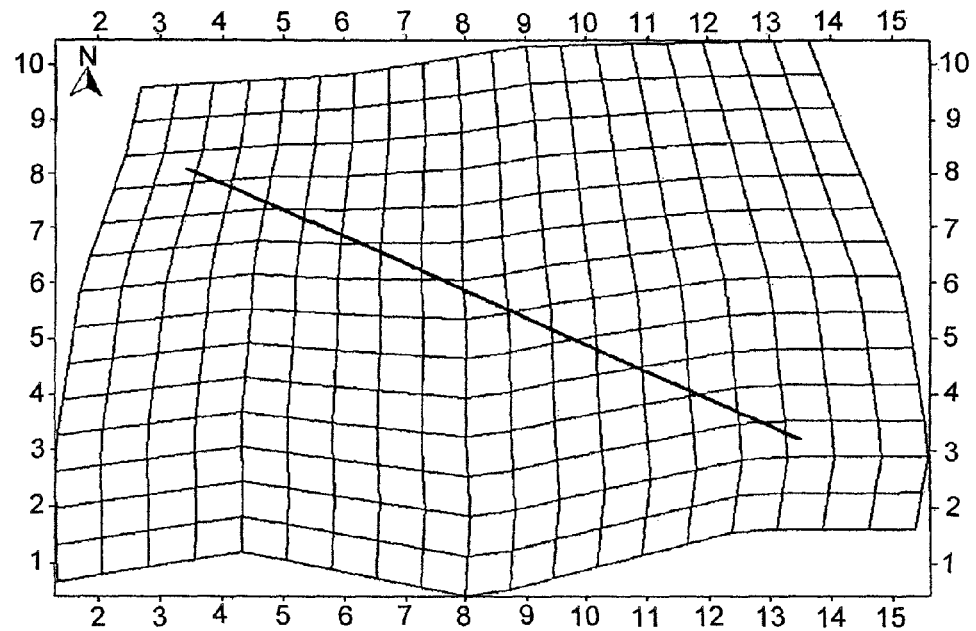
FIG. 2 shows a grid of dimension 20×15 and a fault to be fitted.
Figure 3:
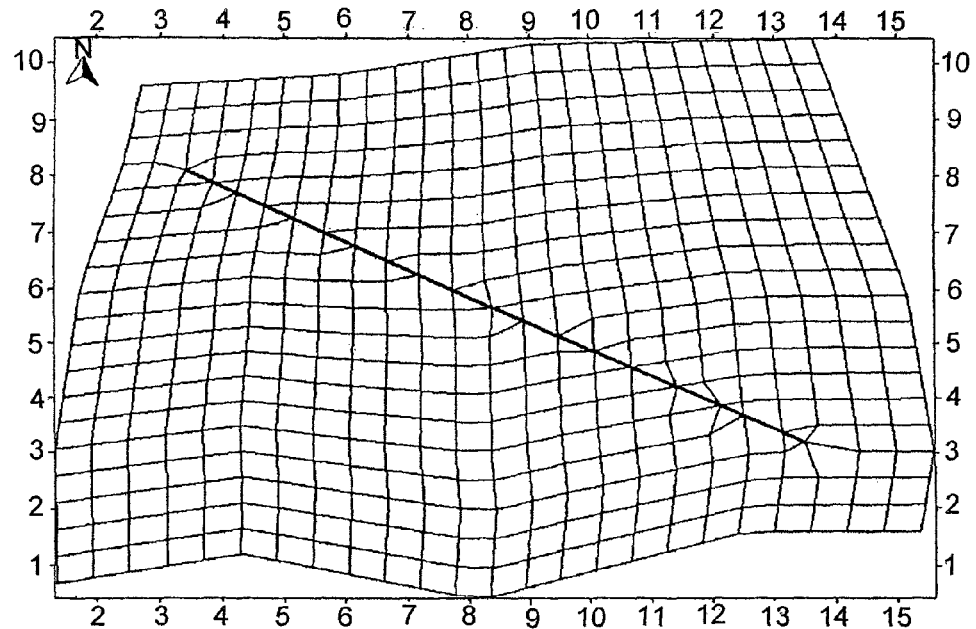
FIG. 3 shows the same grid after fitting with the fault.

The two FIGS. 2 and 3 show a grid before and after accounting for a fault. The black straight line is the open curve representing the fault. It is not part of the mesh.

Case of Multiple Faults

In the presence of multiple faults, not all the nodes of the grid are free to shift, since a node which has already been displaced in order to account for a first fault should not be modified to account for a second fault. The fitting algorithm must therefore account for this new more constraining context, and a refinement procedure may need to be performed in order to get round this constraint.

According to the invention, multiple faults are accounted for within the regular grid, by carrying out the following steps:

a first edge of the grid, intersected by the open line, is determined by scanning the line, segment by segment, starting from one end of the open line;

the end of the edge closest to the point of intersection is displaced towards the point of intersection if this displacement does not generate a quadrilateral at least one angle of which is greater than a fixed angle threshold, and if this end has not already been displaced; otherwise the other end is displaced towards the point of intersection if this end has not already been displaced; otherwise the mesh is refined, until an end can be displaced, and this end is displaced.

The refining of the mesh may be carried out by the following steps:

a new node is added to the mesh, corresponding to a point of intersection between a fault and the edge for which no end can be displaced;

if the edge is vertical, the complete row of the grid containing the point of intersection is split, by adding a succession of horizontal edges, in all the quadrilaterals of the row, the succession of edges passing through the point of intersection;

if the edge is horizontal, the complete column of the grid containing the point of intersection is split, by adding a succession of vertical edges, in all the quadrilaterals of the column, the succession of edges passing through the point of intersection.

This refinement is also applied to all the horizons situated lower down, if the horizons are processed from the lowest to the highest.

Since the method is implemented by a computer, the algorithm relating to this step is described. To describe whether a node is constrained by one or more faults, two notions are introduced: the first termed "faulted degree of a node" and the second termed "passing faults of a node".

Faulted degree of a node: A node S is said to be of faulted degree n if it is the point of intersection of n faults. If n is zero, then no fault passes through this node. Hereinbelow, "df" is assumed to be the functor which returns the faulted degree of a node. The faulted degrees of the nodes are stored as a property of the grid, and are useful for the phase of taking faults into account, in order to verify whether a node is constrained by faults, for the grid optimization phase (df=0: freely shift the node; df=1: project onto the passing fault; df>=2: do not shift), and finally, for the phase of 3D transfer of the grid, so as to decide when and how a node is split.

Passing faults of a node: This is the list of faults which pass through a node. Hereinbelow, "faultsPassing" is assumed to be the functor for recovering the faults which pass through a node.

The global process for fitting multiple faults iterates from bottom to top over all the horizons, so as to generate regular grids and to fit the faults thereto. For each horizon, a grid of the same dimension as those situated lower down (geologically older) is first generated, then all the points of intersection between the faults and the ends of the faults are fitted. The algorithm then iterates over all the faults so as to take them into account in the mesh. When a refinement is necessary on a grid of a horizon in order to partner a fault, the grids of the horizons already processed undergo the same refinement in an exhaustive manner, so as to retain a single dimension for all the grids.

Concerning the structures of the data, on account of the fact that the number of nodes of a grid on a horizon may increase following a refinement, a chained list is used to represent the grid, in order to facilitate the addition of a new node at any position whatsoever. In addition, the nodes crossed by a fault (dubbed "Partnernodes") are recorded in a chained list so as to allow fast insertion.

To fit a given fault, the points of intersection between the fault and the grid are searched for, segment by segment, and the nodes to be shifted up to these points of intersection are decided. A point of intersection is calculated as follows: The calculation begins with the first node in Partnernodes which represents the start of the first segment of the fault. The four cells neighboring of this node termed the "current node" are recovered, and a search for the intersection of the first segment called the "current segment" with these four cells is conducted. If an intersection is found, an end of the edge intersected to shift it to the point of intersection is chosen. The cells neighboring the node representing this intersection become the cells to be visited so as to calculate the next intersection with the same fault segment, excluding those which have the new partner node or the one before as edge or diagonal. If there is no longer any intersection between the current segment and the cells to be visited, the cells to be visited are reassigned with the one which contains the extremity of the current segment, and the process proceeds to the next segment to calculate the intersection, and so on.

In the course of scanning the fault, points that have already been partnered may be encountered, representing for example the intersections of the fault with other faults present on the same horizon. It is therefore necessary to verify for the most recently partnered node, whether there exists a node before the recently partnered in Partnernodes. If there is, if the two nodes form an edge or a diagonal of a quadrilateral, the node before becomes the current node for calculating the cells to be visited, and the process proceeds to the fault segment which corresponds to this node in order to continue the intersection calculation. By way of illustration, the algorithm may thus be described:

```
segmentFault ← 0;
nodeCurrent ← first element in Partnernodes;
cellsToBeVisited ← the four cells having nodeCurrent in
common;
cellsToBeExcluded ← zero;
while true do
    nodeBefore ← the node which follows nodeCurrent in
Partnernodes if it exists, -1 otherwise;
    if nodeCurrent and nodeBefore form an edge or a diagonal then
        if nodeBefore is the last in Partnernodes then
            return;
        end if
        n ← nodeBefore;
        segmentFault ← the fault segment where n is found;
    else
        calculate the intersection of the segmentFault with the
quadsToBeVisited, excluding the quadsToBeExcluded;
        n   ← the appropriate end of the intersected edge;
    end if
    if n! = -1 then
        cellsToBeExcluded ← the cells having n and nodeCurrent
as edge or diagonal;
        nodeCurrent ← n;
        cellsToBeVisited ← the four cells having nodeCurrent in
common;
    else if segmentFault < total number of fault segments then
        cellToBeVisited ← the cell where the second end of the
segmentFault lies;
        cellsToBeExcluded ← zero;
        segmentFault ← segmentFault +1;
    else
        return;
    end if
end while
```

Figure 4:
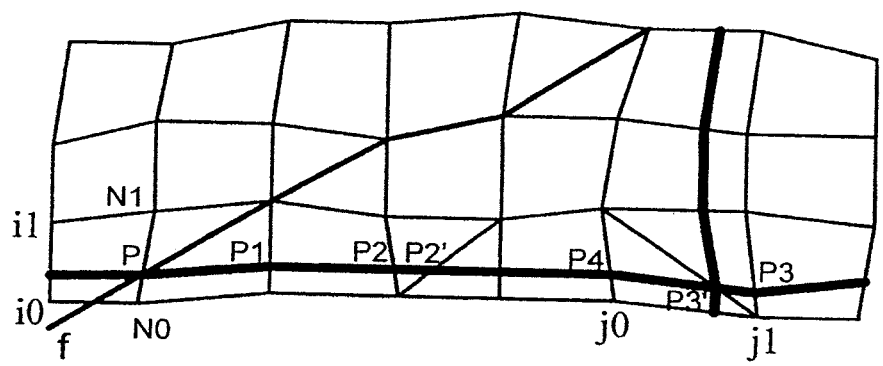
FIG. 4 shows the principle of refining the grid.

The refinement process is triggered by the addition as a new node of a point of intersection between a fault and a grid. Referring to FIG. 4: let P be the point of intersection, N0N1 the edge where P lies. If this edge is horizontal, a succession of vertical edges is added between the vertical edges of indices i0 and i1. On the other hand, if this edge is vertical, the added edges are horizontal and will be situated between the horizontal edges of indices j0 and j1. The ends of these new edges may retain the same proportion as N0P/N0N1 on their corresponding "mother" edges, but the central points are preferable for greater regularity. These ends are inserted into the chained list representing the grid, with nx or ny incremented by 1.

The new edges may be intersected by the already partnered segments of the faults, represented either by an edge, or by a diagonal of a quadrilateral. If it is the first case, the point of intersection is also a node (e.g. P1 in FIG. 4). It is then necessary to insert this node into "Partnernodes" of the corresponding fault. In the second case, it is necessary first to attempt to displace the end of the new edge closer to the point of intersection (For example, shift P2 to P2' in FIG. 4); if this end is on a fault, then the other end has to be shifted. If the two ends are clamped by faults, further refinement is necessary (For example, refine on P3' in FIG. 4).

Figure 5:
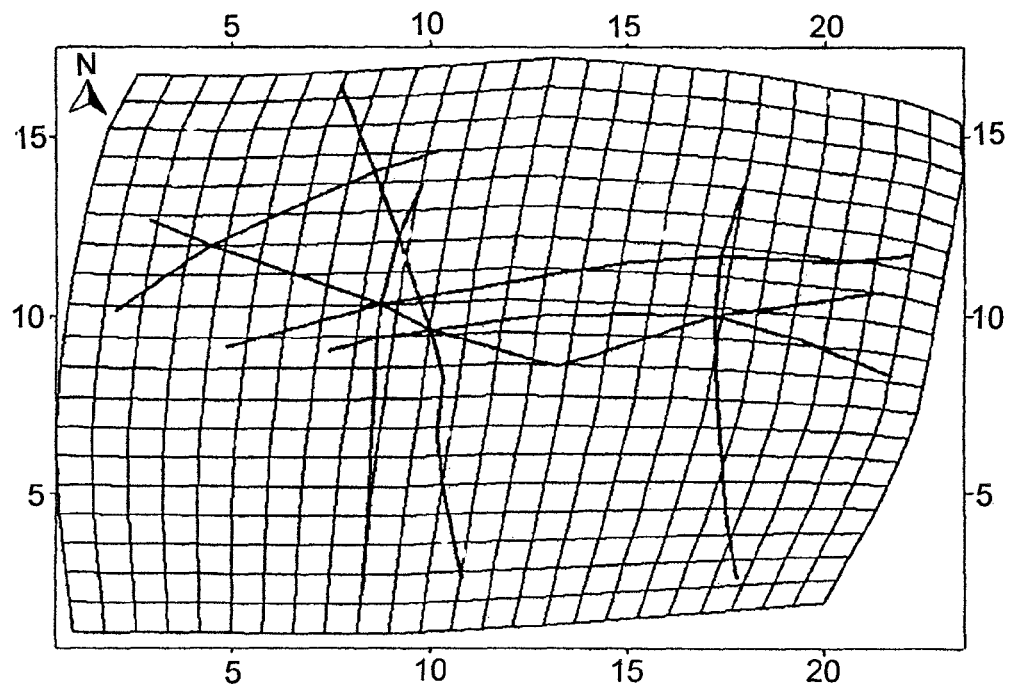
FIG. 5 shows a grid of dimension 25×20 with 7 faults before fitting.
Figure 6:
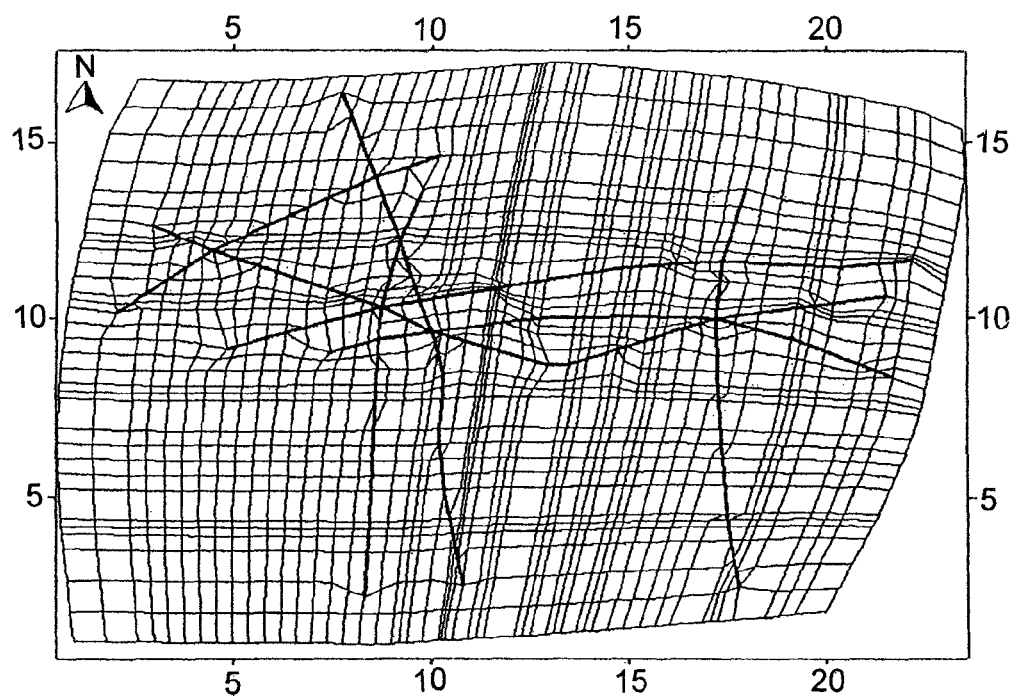
FIG. 6 shows the same grid as FIG. 5, after fitting with these 7 faults. The dimension has become 51×33.

FIGS. 5 and 6 show a grid before and after deformation to account for seven faults. Note that a refinement has been necessary.

Figure 9:
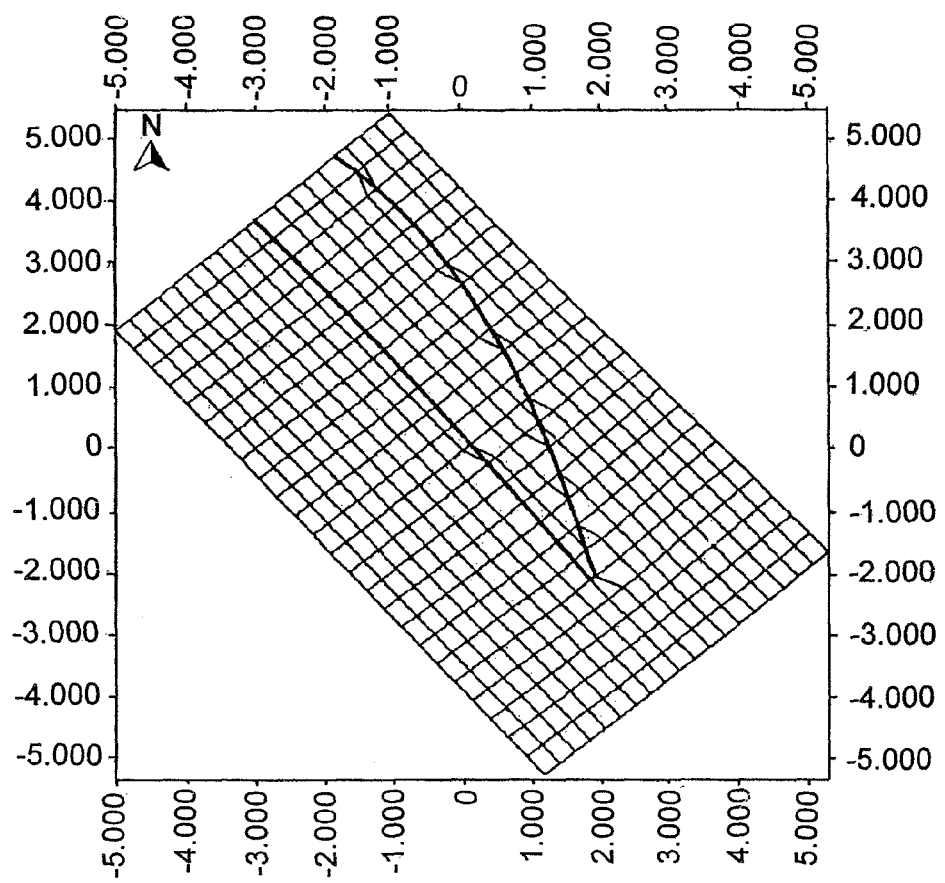
FIG. 9 shows the grid generated on the unfolded horizon of FIG. 8 and fitted with the faults.

FIG. 9 shows a grid taking the faults into account.

4. Iteration Step

Steps 1 to 3 are reiterated for each triangulated three-dimensional surface, preserving the same number of quadrilaterals in each direction.

5. Step of Transferring the Grids to Real Horizons

This step transfers all the regular grids which are deformed to account for the faults, to 3D real horizons.

According to the invention, a regular grid can be transformed into a gridded surface in three dimensions by performing a change of reference frame, from the reference frame of the regular grid to the reference frame of the triangulated 3D surface, of the nodes of the grid. The coordinates of the nodes away from any fault are determined on the basis of their barycentric coordinates in a reference frame defined by the triangle to which they belong of the 2D triangulated surface. The coordinates of the nodes situated on a fault are determined on the basis of their curvilinear abscissae on the fault. The connectivities are then established in such a way as to maximize the number of quadrilaterals. Only the quadrilaterals for which a fault passes through one of its diagonals are divided into two triangles.

Figure 10:
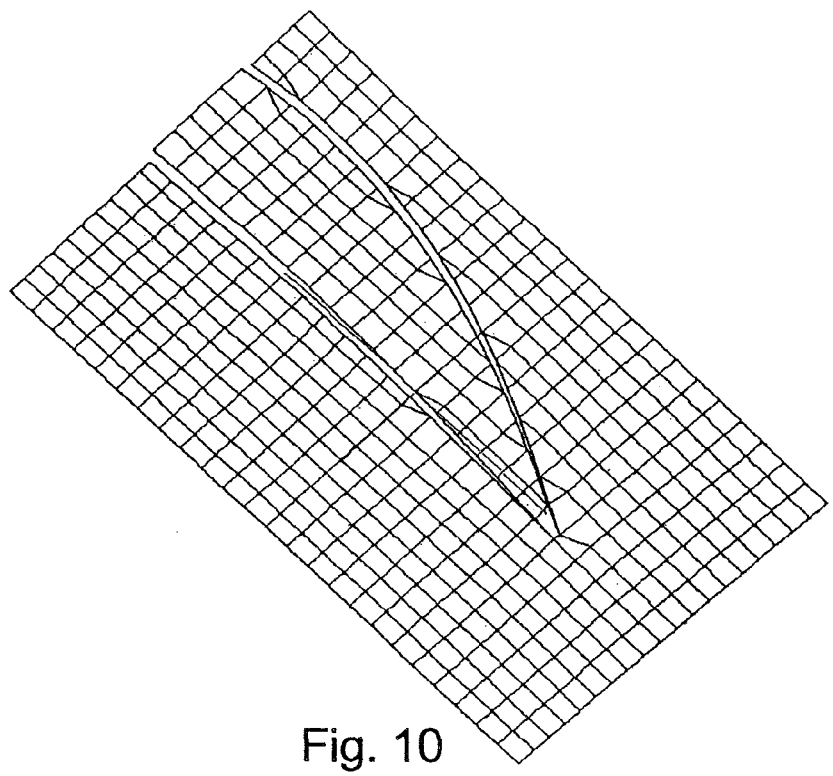
FIG. 10 shows the grid after transfer to a 3D real horizon of the grid of FIG. 9.

In particular, the following steps may be carried out:
the nodes are positioned in the 3D reference frame:
    for each node of the grid situated on a fault, the curvilinear abscissa of the node on the fault is determined, then this node is transferred onto the fault in the 3D reference frame by use of the curvilinear abscissa, and this node is split on each side of the lip of the fault if necessary. The barycentric coordinates of each split node are calculated so as to be able to be relocated in the dynamic context;
    for each node of the grid situated away from a fault, the barycentric coordinates of each node of the grid are determined in a reference frame defined by the triangle to which the node belongs of the 2D triangulated surface, then each node is positioned in a reference frame defined by the triangle to which the node belongs of the 3D triangulated surface, as a function of the barycentric coordinates;
    these nodes are connected by edges in such a way as to obtain a 3D surface meshed with a maximum of quadrilaterals. Only the quadrilaterals for which a fault passes through one of its diagonals are divided into two triangles, as illustrated by FIG. 10.

Figure 11:
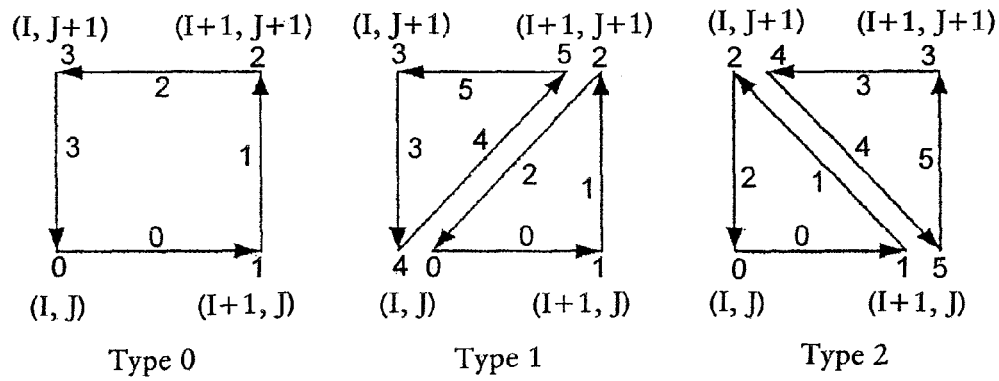
FIG. 11 shows the 3 types of elements of a grid transferred to a 3D horizon.

Since the method is implemented by a computer, the algorithm relating to this step is described. The main structure is dubbed "SplitGrid". It represents a quasi-regular 3D grid, with certain nodes (I, J) split into two or more. FIG. 11 shows three types of pseudo-quadrilateral cells: a normal quadrilateral, a quadrilateral split into two triangles by the diagonal going from the bottom left to the top right, and a quadrilateral split into two triangles by the diagonal going from the bottom right to the top left. The local numbering of the nodes and edges of the quadrilateral is also indicated in the scheme. With this notation of the pseudo-quadrilateral cells, the grid transferred to a 3D real horizon remains a surface IJ.

A "SplitGrid" is described by:
nx and ny: number of columns and of rows
nodes: list of nodes (I, J);
cells: list of cells
For a node (I, J), the following information is stored:
number of split nodes;
containing triangle and the barycentric coordinates in the triangle, if the node is not split;
for each split node a fault number, reference of the side of the fault, fault segment number and curvilinear abscissa of the node on this segment is stored. When the node represents an intersection between faults, the information stored is the node number in the triangulation, the reference of the side of a fault and the other reference of the side of the other fault.
for each split node: coordinates x, y, z.
For a pseudo-quadrilateral cell, the following information is stored:
type of the cell;
number of vertices; and
array of vertices.

Once the nodes of the unfolded grid have been transferred to a real horizon, the connectivity between these nodes is re-established by forming the cells with the three types mentioned above. These cells are constructed one by one by scanning firstly the direction I then J. The following steps are applied to construct a given cell:
    The type of the current cell is firstly determined. To do this, it is merely necessary to verify whether there is a passing fault on one of two diagonals of the quadrilateral in the unfolded grid. If there is, the type is 1 or 2, if not, the type is 0.
    The number of vertices for the cell is then obtained as a function of its type, as well as the global index (I, J) of each vertex.
    With its index (I, J), a determination is made to verify whether each vertex is or is not split, by examining the list of previously filled nodes (I, J).
    For each non-split vertex, its equivalent node is unique and is taken immediately to reconstruct the 3D cell.
    For each split vertex with two or more equivalent nodes, one of its passing faults is recovered first. The side of the fault where the node is placed is calculated according to the following algorithm. The equivalent node is then chosen according to the fault and this side.

Calculating the Side of the Fault for a Node on the Fault

To decide on which side of the fault for a node on the fault, its opposite node in the cell is firstly removed.
    For a cell of type 0, node 0 is opposite node 2, node 1 is opposite node 3, and vice versa.

For a cell of type 1, nodes 0, 2 and 3 are opposite 1, nodes 4, 5 and 1 are opposite 3.

For a cell of type 2, nodes 1, 2 and 3 are opposite 0, nodes 4, 5 and 0 are opposite 3.

In a general manner, a node and its opposite counterpart are never on the same fault. Thus, the opposite node is situated on one side of the fault instead of lying on the fault. The appropriate side of the fault is then calculated as a function of this opposite node. To do this, the fault segment where the node to be transferred is situated (side 0) is recovered first. Thereafter, the triangles incident at each extremity of the fault segment are calculated. A single common incident triangle exists for the two extremities. Its vertices are the two extremities of the fault segment, that is B and C, and a third which is not situated on the fault, that is A. Let P be the node opposite the node to be transferred, P is therefore not on the fault. If P and A lie on two different sides of the fault segment BC, that is to say the barycentric coordinate of P is negative with respect to A in the triangle ABC (in 2D space), the side of the fault for the node to be transferred will be 1. Otherwise it is 0.

--- find the opposite node P in the cell;
side ← 0;
recover the fault segment where the node is situated;
recover the triangles incident at an extremity of the fault segment;
recover the triangles incident at the other extremity of the fault segment;
tag the common triangle of two groups of triangles above;
let A, B, C be the vertices of the triangle, B and C constitute the fault segment;
$\alpha \leftarrow (\vec{PB} \times \vec{PC})/(\vec{AB} \times \vec{AC})$;
if $\alpha < 0$ then
    side ← 1;
end if
return side;

---

6. Step of Constructing the First Three-Dimensional Mesh

This step constructs the first three-dimensional mesh of the basin which represents the oldest sedimentary layer.

i. The two 3D grids of two horizons which are the lowest (the oldest in terms of geological deposition time) are first deformed according to the new geometry of the subjacent triangulations of the first geological instant. This involves repositioning the nodes of the grid according to their barycentric coordinates in the triangulation at the geological instant concerned.

ii. The quadrilaterals having the same coordinates I, J on the two lowest horizons (the oldest since they were deposited first) are then joined directly in such a way as to form three-dimensional mesh cells, simply called cells and forming hexahedra.

Figure 13:
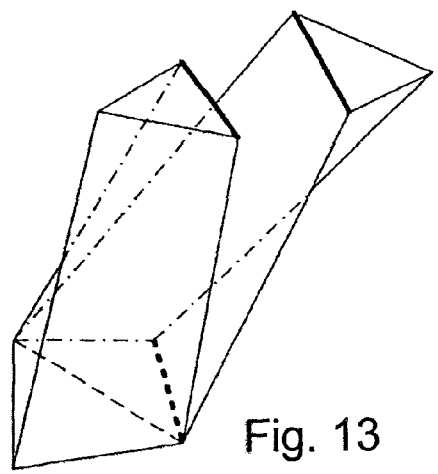

When a quadrilateral, on a horizon, is split into two triangles via a fault which passes through the diagonal, the corresponding quadrilateral on all the other horizons is also cut virtually in the same way. Thus, two prisms instead of a hexahedron are formed between two horizons. In FIG. 13, the segments drawn in bold are on the same fault surface, it is seen that the quadrilateral in the bottom left of the fault meets up with two triangles in the top left and right of the fault.

Figure 12:
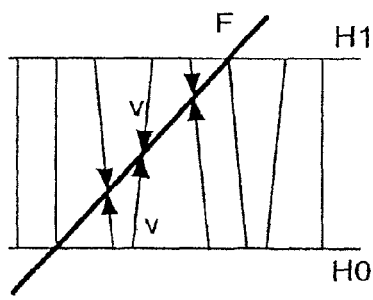
FIG. 12 shows the principle of matching two horizons.

When there are two quadrilaterals of like coordinates (I, J) split on a horizon split into two triangles via the diagonal going from the bottom left to the top right, and another corresponding quadrilateral is split via the diagonal going from the top left to the bottom right, all the quadrilaterals of the same column are divided into four triangles via their two diagonals.

iii. However, two surface elements (triangles, quadrilaterals) of a horizon when matching may straddle a fault. These two elements should therefore not be joined directly so as not to cross the interface of the fault. It is possible to imagine cutting the mesh cells if they are crossed by a fault as illustrated in FIG. 12. However this is not always acceptable for the simulator in that a problematic configuration is produced when the horizons on the two sides of the fault slide over the latter, as illustrated by FIG. 14. Elements are incorrectly constructed outside of the layer formed between the horizons H0 and H1 by joining the same values of i and j. It is therefore necessary to account for the faults between the two horizons, when constructing the three-dimensional mesh. To do this, the method comprises the following three steps:

a. Detection of Problematic Cells
b. Construction of Cells Along Faults
c. Regularizations of Degenerate Elements
a. Detection of Problematic Cells A cell is said to be problematic when the two surface elements (triangles, quadrilaterals) of a horizon when matching, and forming the top and the bottom of the cell, straddle a fault. The method according to the invention comprises a step of detecting such a configuration. This step comprises the following steps:

1. A chart is constructed for each fault. This chart is a unitary lattice on which the closed trace of the associated fault is superimposed. FIG. 16 illustrates such a chart. To close the trace, the same ends of each trace are joined so as to form a domain between the two traces (one trace per horizon).

2. For each chart, a faulted zone is defined on the chart according to the following principle. A quadrilateral or a triangle (formed by dividing a quadrilateral along its diagonal) is included (totally or partially) in the domain between the two traces forms part of the faulted zone.

3. A problematic cell is determined by applying the following rule. If two surface elements to be joined lie in the faulted zone, then a problematic configuration is present.

b. Construction of Cells Along Faults

In the course of a first scan, all the surface elements (triangles, quadrilaterals) of a horizon are scanned. The cells that are not crossed by faults are constructed, and the cutting fault and the surface elements at the top and bottom of a cell crossed by this fault are recorded in a list for subsequent processing. Each connection between a node on a fault and another node is placed in a "map" (a data structure which is composed of a collection of unique keys and of another collection of values with a key being associated with one or more values) with the node on the fault as value and the other node as key.

In the course of a second scan, all the surface elements recorded in the list which were constructed during the first scan are scanned. The scanning of this list is reiterated until all the surface elements are processed to form cells. An iteration is composed of the following steps:

i. For each node of a surface element of the list, a search is made for a connecting node in the "map" previously constructed:

if such a node is found, it is then used as node to form the connection, and this connection is recorded in a local list relating to this surface element;

if no connecting node is found, and if this node is on the fault, this node is joined to itself.

ii. After the node-by-node recovery of the connecting nodes, if all the nodes of the face are connected, processing proceeds to the next face.

iii. Otherwise, these nodes are projected onto the cutting fault along the same direction as the connection of greatest length in the local list. Then these nodes are joined with their images on the fault (FIG. 15) and these new connections are recorded in the "map". The barycentric coordinates of the projected image are recorded with the containing triangle, along with the projecting node and the fault number. This information is useful in order to upgrade the volume mesh.

iv. If there are still unconnected nodes but no connection is tagged in the local list of connections, then the surface element is appended to the list of surface elements.

c. Regularizations of Degenerate Cells

The method according to the invention for constructing cells along faults may produce degenerate prisms or hexahedra in proximity to the faults. A degenerate cell is a cell having at least two vertices in common. This degeneracy is due to the fact that a node can be joined to itself. This is not acceptable for the calculator (basin simulator). According to the invention, the degenerate cells are therefore regularized so that the simulators can produce usable results.

Figure 17:
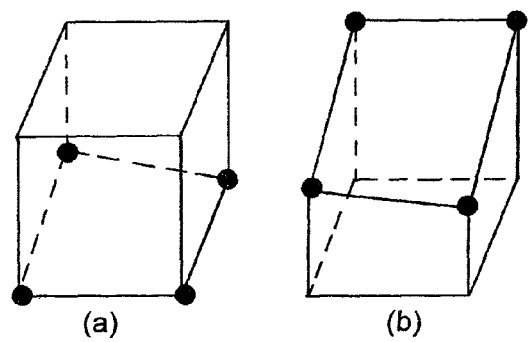
FIGS. 17 to 24 show the regularization of the degenerate mesh cells.
Figure 18:
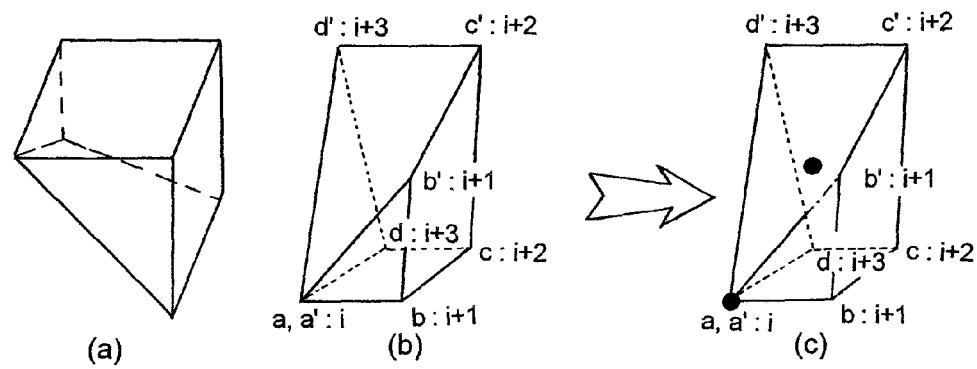
Figure 19:
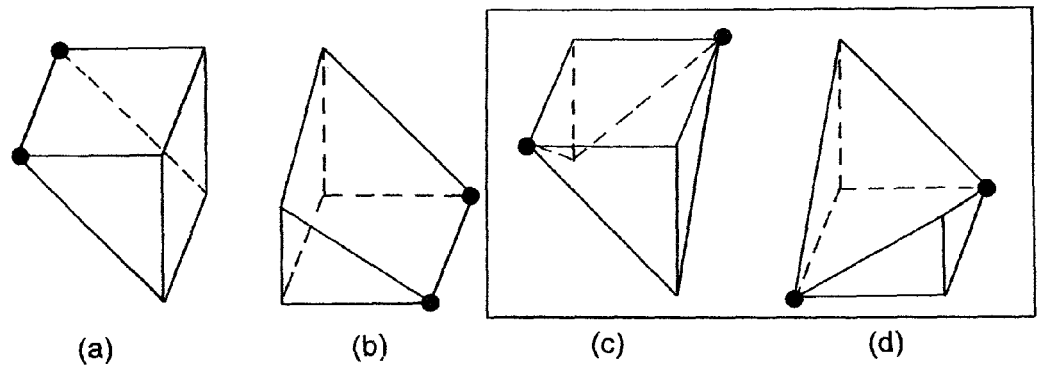
Figure 20:
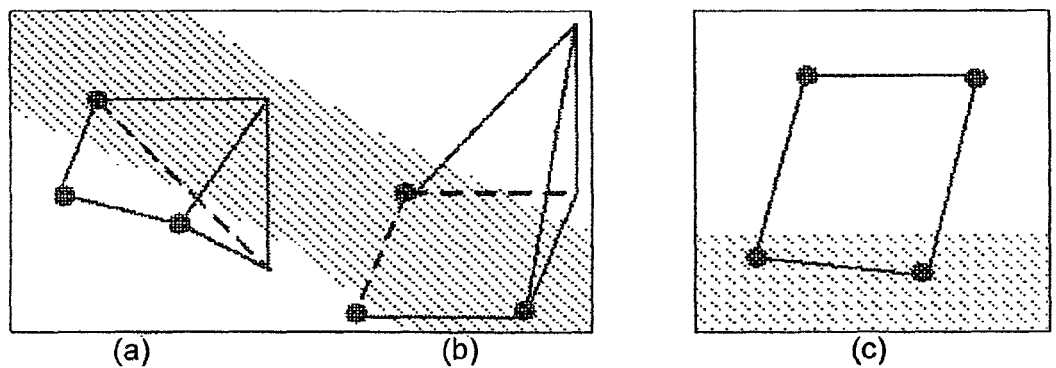

In the case of a hexahedron created to connect a quadrilateral of a horizon with its image on a fault, this hexahedron may have zero, one, two, three or four vertices of the quadrilateral that are in common with its image on the fault. This therefore yields a nondegenerate hexahedron (FIG. 17), or a degenerate hexahedron with seven, six, five or four distinct vertices (FIGS. 18 to 20). The last two situations are nevertheless not possible (FIGS. 19(c), 19(d) and 20). These situations never arise since a fault can never pass through two opposite vertices of a quadrilateral, nor through three or four vertices at the same time. Thus:

For a degenerate hexahedron with seven distinct vertices, as shown in FIGS. 18(a) and 18(b), the element is split into two tetrahedra and four pyramids by connecting the center of the element with its six faces. This solution is illustrated in FIG. 18(c).

For a degenerate hexahedron with seven distinct vertices, as shown in FIGS. 19(a) and 19(b), the element is replaced with a prism.

Figure 21:
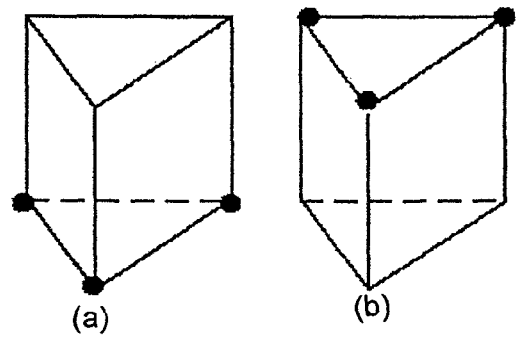
Figure 22:
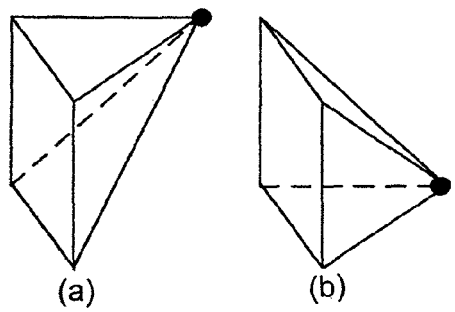
Figure 23:
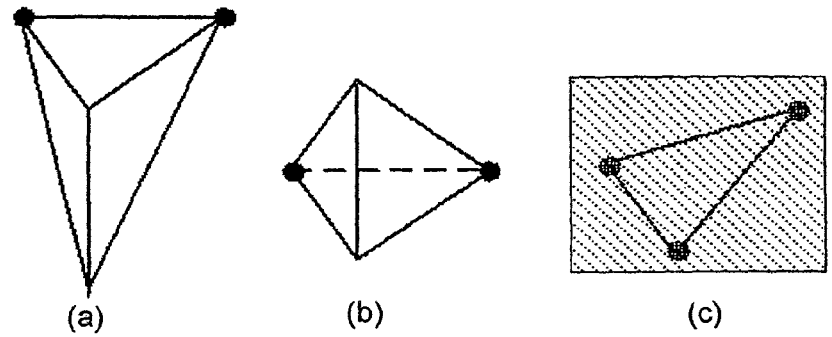

In the case of a prism created in order to connect a triangle of a horizon with its image on a fault, this prism may have zero, one, two or three vertices of the triangle that are in common with its image on the fault. This therefore yields a nondegenerate prism (FIG. 21), or a degenerate prism with five, four or three distinct vertices (FIGS. 22, 23). Nevertheless, a degenerate prism with three distinct vertices never arises, since a fault can never pass through three vertices of a triangle at the same time. Thus:

For a degenerate prism possessing only five vertices, the regularization replaces the prism with a pyramid.

For a degenerate prism possessing only four vertices, the regularization replaces the prism with a tetrahedron.

Figure 24:
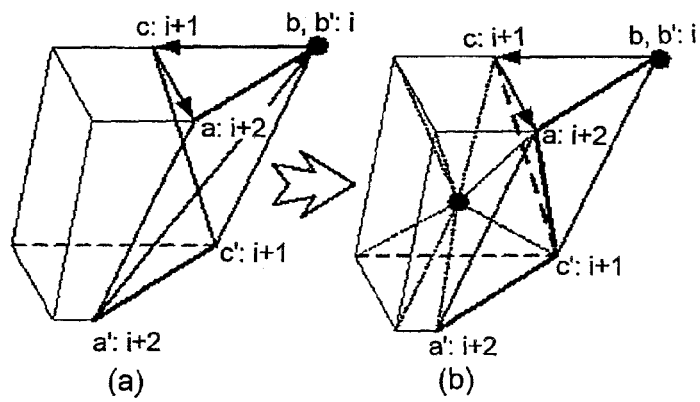

In the case of a prism created to connect two triangles of a horizon with a quadrilateral of another horizon, it is noted that these prisms are often degenerate (See FIG. 24). This degeneracy is due to the fact that the same nodes (I, J) are always joined. It is necessary to detect this degeneracy and then to optimize the elements concerned. The detection is carried out as follows. During the creation of the faulted elements, if the element created is a prism with a vertex in common, and if the two corresponding surface forming elements are respectively a quadrilateral and two triangles, then a potential degeneracy is detected and is added to the list of elements to be optimized. Concerning optimization, two scans are executed. The first works on the entire list of elements to be optimized, and its aim is to replace the prism with a tetrahedron, and to record the neighboring element which is influenced by this replacement. The second scan cleaves each neighboring element recorded by joining its center with each of its faces, one of which is divided into two triangles by one of its diagonals, calculated during the first scan.

In FIG. 24(a) the element abc-a'b'c' is the prism to be optimized which has two vertices b, b' in common. It is degenerated into a pyramid having acc'a' as base and b/b' as tip. The two lateral faces aa'b and a'c'b lie in the same pseudoplane formed by two faulted edges ab and a'c', and the base acc'a' is twisted, this being undesirable. In FIG. 24(b) a regularization solution is proposed. It is assumed that the superimposed vertices b/b' have local index "i". The local indices for the other nodes of the element are thus determined, as are the local indices for the edges at the top and bottom. The replacing tetrahedron is abcc', formed from the triangle abc on the same horizon as the superimposed vertices b/b'. The fourth vertex is c'. The node with (i+1) is a local index in the triangle on the other horizon. The neighboring element influenced is that having the face a'c'ca in common. To remain in conformity with the interface of this common face, the latter is cut into two triangles. Consequently, the neighboring element is divided by joining its center with each of its faces.

Thus, the regularization method applied is as follows:

For Cells Created in Order to Connect a Triangle or Quadrilateral of a Horizon on a Fault:

When the cell is a degenerate hexahedron possessing only seven vertices, then the regularization cuts the cell into two tetrahedra and four pyramids by connecting the center of the cell with its six faces.

When the cell is a degenerate hexahedron possessing only six vertices, then the regularization replaces the cell with a prism.

When the cell is a degenerate prism possessing only five vertices, then the regularization replaces the prism with a pyramid.

When the cell is a degenerate prism possessing only four vertices, then the regularization replaces the prism with a tetrahedron.

For Cells Created in Order to Connect Two Triangles of a Horizon with a Quadrilateral of Another Horizon:

When the degenerate cell (a prism) possesses only four vertices, then the regularization replaces the prism with a tetrahedron, and then for each neighboring element its center is joined with each of its faces. One of the faces is divided into two triangles by one of its diagonals.

7. Step of Iterating on Later Geological Instants

All the grids of the horizons present at the current instant are first updated according to the new geometries of their subjacent triangulations. The mesh obtained for the previous instant is also deformed so as to follow the displacement of its nodes. A new sedimentary layer is added to the mesh with the technique described previously.

According to an embodiment, this step comprises the defining of a path of evolution for the new nodes within each iteration over the later geological instants.

A new layer corresponds to a geological deposition event. Although the event is represented by a single instant, this deposition does not happen all at once. To the contrary, it occurs in a continuous manner and often takes millions of years. To simulate the associated physical or chemical phenomena, the numerical scheme for basin modeling defines certain information specific to a new layer, this being:

a start of the instant of deposition;

an end of the instant of deposition;

intermediate states linearly interpolated between the start and the end of the instant of deposition.

The start of an instant corresponds to the end of the previous instant, and the end of an instant corresponds to the start of the next instant. For a new layer, it is considered to be deposited from the upper horizon at the previous instant. Consequently, at the start of its instant of deposition, a layer has a zero thickness, and attains its maximum value at the end of the instant. The series of volume meshes generated by the process described previously corresponds to the terminal state of each instant of deposition. It is therefore necessary to be able to deduce their initial states. This deduction is done on the mesh nodes. The initial position of each node at the apex of the new layer is defined. This is called "the definition of the path of evolution of the nodes".

Figure 25:
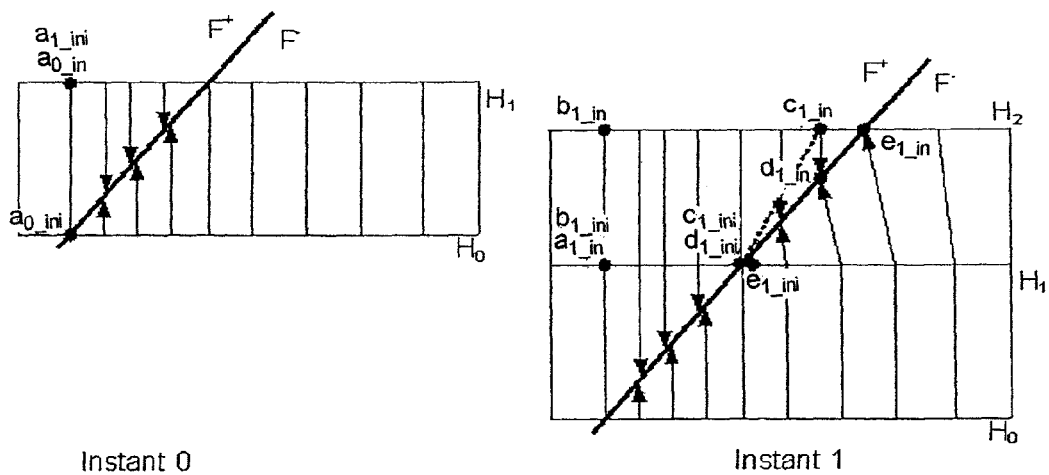
FIGS. 25 and 26 illustrate the definition of path of evolution of the nodes.
Figure 26:
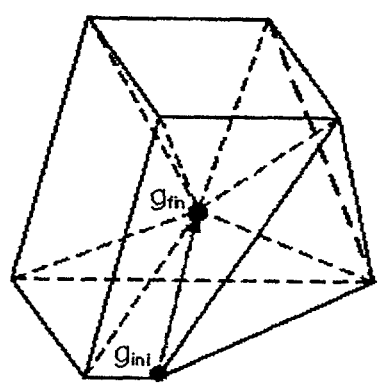

Referring now to FIG. 25, for a node at the apex of the new layer, it is either on the top horizon (node a0_end, b1_end, c1_end), or on a fault which enters the layer (node e1_end). This node is joined vertically to another node, which is either on the bottom horizon (node a0_ini, b1_ini, e1_ini), or on a fault (node d1_end). Nodes exist which are situated in the middle of the layer (node gend in FIG. 26) and which are joined to the nodes on the bottom horizon.

If a node at the apex of the new layer is joined to another node on the bottom horizon, the latter may be used as initial position. When a node at the apex of the new layer is joined to another node positioned on a fault situated in the middle of the layer, the node does not yet exist at the start of the instant of deposition. Consequently, it cannot be used as initial position. A solution based on the fault props is proposed in order to solve this problem of defining the path of evolution.

To avoid the possible problem of the strict definition of the initial positions of the nodes at the apex of a new layer, only the nodes on the bottom horizon are referenced in order to define the initial position of a node. This technique is based on the fault prop nodes, it proceeds according to one of the following three cases:

for each node at the apex of the new layer which is joined to another node positioned on a fault, the initial position of this node is defined by the corresponding prop node of the fault. Thus, c1_ini(d1_ini) defines the initial position of c1_end (FIG. 25);

for each node of the new layer which is positioned on a fault, the initial position of this node is defined by the corresponding prop node of the fault. The connecting node on the bottom horizon is not taken, since the two sides of the fault are not stuck together in this case throughout the deposition process. Thus, d1_ini(c1_ini) defines the initial position of d1_end; the path of evolution of e1_ini, the fault prop on the other side, to e1_end is defined in the same manner (FIG. 25);

for a node not positioned on a fault and situated in the middle of the new layer, the initial position of this node is defined by one of the connecting nodes on the bottom horizon. Thus, in FIG. 26, g1_ini, the fault prop on the other side defines the initial position of g1_end.

Figure 27:
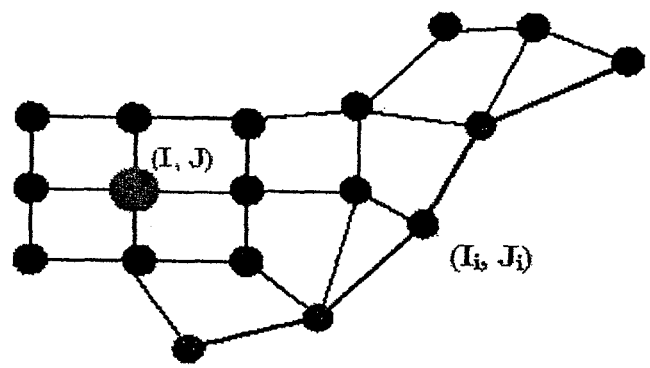
FIG. 27 illustrates the algorithm for choosing a prop node to define the initial position of a node.

The prop of a fault here designates the two traces of the fault on the bottom horizon of a layer. The prop node which corresponds to a node at the apex of a new layer has to be chosen from among the nodes constituting the fault trace on the same side as the node at the apex of the new layer. This choice is made based on the strategy of the "shortest path" between the prop nodes of the fault and the node at the apex of the new layer (FIG. 27). A path between two nodes (I, J) and (Ii, Ji) is defined by $|I-Ii|+|J-Ji|$. For a node positioned on a fault in the middle of the layer, its coordinates (I, J) are the same as its connecting node.

The data structure associated with the definition of an evolution path is a "map" which associates the node representing the initial position with that representing its final position. This "map" is updated with the coupling of the nodes at the top and bottom of a normal cell (non-faulted) during its creation. It is thereafter completed by adding pairs (node at the apex of the new layer, fault prop node) during the construction of the faulted cells. Finally, the step of regularizing volume elements sometimes forms nodes that are not positioned on a fault in the middle of the layer, the evolution path of which is also charted in the "map".

A mesh constructed according to the invention is particularly suited for simulating the history of the formation of oil systems within a basin in a zone of complex geometry, thus providing an accurate tool for carrying out basin modeling. In particular, the mesh generated in the current state may serve as support in the modeling of the burial history of the sediments (the restoration of sedimentary basins) and for the simulation of flows in a reservoir.

Thus a method for simulating the formation of oil systems within a subterranean porous medium in a zone of complex geometry comprises the generation of a changeable hex-dominant mesh on the basis of the method according to the invention, and then the carrying out of simulations by suitable software (basin simulator or reservoir simulator) utilizing the mesh thus generated. These simulations allow optimizing oil field exploration, subterranean reservoir exploration or exploitation.

A method of exploiting a subterranean medium, then comprises the generating of a mesh of the medium according to the invention, the carrying out of at least one flow simulation by software, such as a basin simulator, utilizing the mesh, using simulation to define an exploitation scheme for the medium, and the implementation of the exploitation scheme.

The invention claimed is:

1. A method for generating a mesh of a subterranean medium comprising at least one sedimentary layer crossed by at least one fault, the at least one layer being defined vertically by two geological horizons discretized by two triangulated three-dimensional surfaces, comprising:
   i. transferring each three-dimensional surface into a regular two-dimensional grid by an isometric unfolding accounting for the at least one fault, while preserving an identical number of quadrilaterals in each direction for each grid;
   ii. transferring each regular grid into a three-dimensional gridded surface and transferring each quadrilateral crossed by the at least one fault at the level of a diagonal into two triangles wherein each gridded surface comprises a set of triangular and quadrilateral surface elements;
   iii. generating the mesh of the subterranean medium by generating cells by creating links between nodes of surface elements of the two three-dimensional gridded surfaces by detecting nodes of a first gridded surface that are situated on one side of the fault different from a side of a node of a second gridded surface having like coordinates;
   joining each undetected node of the first gridded surface with a node of the second gridded surface having like coordinates;
   joining each detected node of the first gridded surface with the at least one fault by considering a direction of a neighboring node; and
   regularizing cells having at least two common vertices.

2. A method according to claim 1, in which the detecting of nodes is carried out by constructing a chart of a lattice on which a closed trace of the at least one fault is superimposed wherein the closed trace corresponds to traces of the at least one fault on each of the gridded surfaces and detecting the nodes to be joined which are present in the closed trace.

3. A method according to claim 1, in which cells are regularized by the steps of:
for cells created to connect a surface element on at least one fault when the cell is a hexahedron, possessing only seven vertices, splitting the cell into two tetrahedra and four pyramids by connecting the center of the cell with its six faces and when the cell is a hexahedron, possessing only six vertices, replacing the cell with a prism;
when the cell is a prism, possessing only five vertices, replacing the cell with a pyramid and when the cell is a prism, possessing only four vertices, replacing the cell with a tetrahedron; for cells created in order to connect two triangles with a quadrilateral, when the cell is a prism, possessing only four vertices, replacing the prism with a tetrahedron, then for each neighboring element, joining a center of each neighboring element with each face thereof with one of the faces which is divided into two triangles by a diagonal thereof.

4. A method according to claim 2, in which cells are regularized by the steps of:
for cells created to connect a surface element on at least one fault when the cell is a hexahedron, possessing only seven vertices, splitting the cell into two tetrahedra and four pyramids by connecting the center of the cell with its six faces and when the cell is a hexahedron, possessing only six vertices, replacing the cell with a prism;
when the cell is a prism, possessing only five vertices, replacing the cell with a pyramid and when the cell is a prism, possessing only four vertices, replacing the cell with a tetrahedron; for cells created in order to connect two triangles with a quadrilateral, when the cell is a prism, possessing only four vertices, replacing the prism with a tetrahedron, then for each neighboring element, joining a center of each neighboring element with each face thereof with one of the faces which is divided into two triangles by a diagonal thereof.

5. A method according to claim 1, in which the mesh is able to evolve comprising modifying the mesh to account for a deposition of a new sedimentary layer in a course of a subsequent geological time by defining a path of evolution of the nodes at an apex of the medium and by deforming the mesh according to a path of evolution.

6. A method according to claim 2, in which the mesh is able to evolve comprising modifying the mesh to account for a deposition of a new sedimentary layer in a course of a subsequent geological time by defining a path of evolution of the nodes at an apex of the medium and by deforming the mesh according to a path of evolution.

7. A method according to claim 3, in which the mesh is able to evolve comprising modifying the mesh to account for a deposition of a new sedimentary layer in a course of a subsequent geological time by defining a path of evolution of the nodes at an apex of the medium and by deforming the mesh according to a path of evolution.

8. A method according to claim 4, in which the mesh is able to evolve comprising modifying the mesh to account for a deposition of a new sedimentary layer in a course of a subsequent geological time by defining a path of evolution of the nodes at an apex of the medium and by deforming the mesh according to a path of evolution.

9. A method according to claim 1, in which a fault is accounted for within the regular grid by performing the steps:
transferring each triangulated three-dimensional surface into a triangulated two-dimensional surface on which the fault is projected by isometric unfolding wherein the fault is projected to form segments describing an open line;
a first edge of the grid intersected by the open line is determined by scanning the line, segment by segment, starting from one end of the open line; and
the end of an intersected edge closest to a point of intersection is displaced towards the point of intersection.

10. A method according to claim 2, in which a fault is accounted for within the regular grid by performing the steps:
transferring each triangulated three-dimensional surface into a triangulated two-dimensional surface on which the fault is projected by isometric unfolding wherein the fault is projected to form segments describing an open line;
a first edge of the grid intersected by the open line is determined by scanning the line, segment by segment, starting from one end of the open line; and
the end of an intersected edge closest to a point of intersection is displaced towards the point of intersection.

11. A method according to claim 3, in which a fault is accounted for within the regular grid by performing the steps:
transferring each triangulated three-dimensional surface into a triangulated two-dimensional surface on which the fault is projected by isometric unfolding wherein the fault is projected to form segments describing an open line;
a first edge of the grid intersected by the open line is determined by scanning the line, segment by segment, starting from one end of the open line; and
the end of an intersected edge closest to a point of intersection is displaced towards the point of intersection.

12. A method according to claim 4, in which a fault is accounted for within the regular grid, by performing the steps:
transferring each triangulated three-dimensional surface into a triangulated two-dimensional surface on which the fault is projected by isometric unfolding wherein the fault is projected to form segments describing an open line;
a first edge of the grid intersected by the open line is determined by scanning the line, segment by segment, starting from one end of the open line; and
the end of an intersected edge closest to a point of intersection is displaced towards the point of intersection.

13. A method according to claim 5, in which a fault is accounted for within the regular grid, by performing the steps:
transferring each triangulated three-dimensional surface into a triangulated two-dimensional surface on which the fault is projected by isometric unfolding wherein the fault is projected to form segments describing an open line;
a first edge of the grid intersected by the open line is determined by scanning the line, segment by segment, starting from one end of the open line; and
the end of an intersected edge closest to a point of intersection is displaced towards the point of intersection.

14. A method according to claim 6, in which a fault is accounted for within the regular grid, by performing the steps:
transferring each triangulated three-dimensional surface into a triangulated two-dimensional surface on which the fault is projected by isometric unfolding wherein the fault is projected to form segments describing an open line;
a first edge of the grid intersected by the open line is determined by scanning the line, segment by segment, starting from one end of the open line; and the end of an intersected edge closest to a point of intersection is displaced towards the point of intersection.

15. A method according to claim 7, in which a fault is accounted for within the regular grid, by performing the steps:
transferring each triangulated three-dimensional surface into a triangulated two-dimensional surface on which the fault is projected by isometric unfolding wherein the fault is projected to form segments describing an open line;
a first edge of the grid intersected by the open line is determined by scanning the line, segment by segment, starting from one end of the open line; and
the end of an intersected edge closest to a point of intersection is displaced towards the point of intersection.

16. A method according to claim 8, in which a fault is accounted for within the regular grid, by performing the steps:
transferring each triangulated three-dimensional surface into a triangulated two-dimensional surface on which the fault is projected by isometric unfolding wherein the fault is projected to form segments describing an open line;
a first edge of the grid intersected by the open line is determined by scanning the line, segment by segment, starting from one end of the open line; and
the end of an intersected edge closest to a point of intersection is displaced towards the point of intersection.

17. A method according to claim 1, in which the medium comprises faults which are accounted for within the regular grid by performing the steps:
determining a first edge of the grid, intersected by the open line, by scanning the open line, segment by segment, starting from one end of the open line;
displacing an end of the edge closest to a point of intersection towards a point of intersection if the displacement does not generate a quadrilateral having at least one angle greater than a fixed angle threshold, and if the end has not already been displaced; otherwise
displacing another end towards the point of intersection if the end has not already been displaced; and otherwise
refining the mesh, until an end can be displaced, and then displacing the end.

18. A method according to claim 2, in which the medium comprises faults which are accounted for within the regular grid by performing the steps:
determining a first edge of the grid, intersected by the open line, by scanning the open line, segment by segment, starting from one end of the open line;
displacing an end of the edge closest to a point of intersection towards a point of intersection if the displacement does not generate a quadrilateral having at least one angle greater than a fixed angle threshold, and if the end has not already been displaced; otherwise
displacing another end towards the point of intersection if the end has not already been displaced; and otherwise
refining the mesh, until an end can be displaced, and then displacing the end.

19. A method according to claim 3, in which the medium comprises faults which are accounted for within the regular grid by performing the steps:
determining a first edge of the grid, intersected by the open line, by scanning the open line, segment by segment, starting from one end of the open line;
displacing an end of the edge closest to a point of intersection towards a point of intersection if the displacement does not generate a quadrilateral having at least one angle greater than a fixed angle threshold, and if the end has not already been displaced; otherwise
displacing another end towards the point of intersection if the end has not already been displaced; and otherwise
refining the mesh, until an end can be displaced, and then displacing the end.

20. A method according to claim 4, in which the medium comprises faults which are accounted for within the regular grid by performing the steps:
determining a first edge of the grid, intersected by the open line, by scanning the open line, segment by segment, starting from one end of the open line;
displacing an end of the edge closest to a point of intersection towards a point of intersection if the displacement does not generate a quadrilateral having at least one angle greater than a fixed angle threshold, and if the end has not already been displaced; otherwise
displacing another end towards the point of intersection if the end has not already been displaced; and otherwise
refining the mesh, until an end can be displaced, and then displacing the end.

21. A method according to claim 5, in which the medium comprises faults which are accounted for within the regular grid by performing the steps:
determining a first edge of the grid, intersected by the open line, by scanning the open line, segment by segment, starting from one end of the open line;
displacing an end of the edge closest to a point of intersection towards a point of intersection if the displacement does not generate a quadrilateral having at least one angle greater than a fixed angle threshold, and if the end has not already been displaced; otherwise
displacing another end towards the point of intersection if the end has not already been displaced; and otherwise
refining the mesh, until an end can be displaced, and then displacing the end.

22. A method according to claim 6, in which the medium comprises faults which are accounted for within the regular grid by performing the steps:
determining a first edge of the grid, intersected by the open line, by scanning the open line, segment by segment, starting from one end of the open line;
displacing an end of the edge closest to a point of intersection towards a point of intersection if the displacement does not generate a quadrilateral having at least one angle greater than a fixed angle threshold, and if the end has not already been displaced; otherwise
displacing another end towards the point of intersection if the end has not already been displaced; and otherwise
refining the mesh, until an end can be displaced, and then displacing the end.

23. A method according to claim 7, in which the medium comprises faults which are accounted for within the regular grid by performing the steps:
determining a first edge of the grid, intersected by the open line, by scanning the open line, segment by segment, starting from one end of the open line;
displacing an end of the edge closest to a point of intersection towards a point of intersection if the displacement does not generate a quadrilateral having at least one angle greater than a fixed angle threshold, and if the end has not already been displaced; otherwise
displacing another end towards the point of intersection if the end has not already been displaced; and otherwise
refining the mesh, until an end can be displaced, and then displacing the end.

24. A method according to claim 8, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise
  refining the mesh, until an end can be displaced, and then displacing the end.

25. A method according to claim 9, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise
  refining the mesh, until an end can be displaced, and then displacing the end.

26. A method according to claim 10, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise
  refining the mesh, until an end can be displaced, and then displacing the end.

27. A method according to claim 11, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise
  refining the mesh, until an end can be displaced, and then displacing the end.

28. A method according to claim 12, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise
  refining the mesh, until an end can be displaced, and then displacing the end.

29. A method according to claim 13, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise
  refining the mesh, until an end can be displaced, and then displacing the end.

30. A method according to claim 14, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise
  refining the mesh, until an end can be displaced, and then displacing the end.

31. A method according to claim 15, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise
  refining the mesh, until an end can be displaced, and then displacing the end.

32. A method according to claim 16, in which the medium comprises faults which are accounted for within the regular grid by performing the steps:
  determining a first edge of the grid, intersected by the open line, by scanning the open line, segment by segment, starting from one end of the open line;
  displacing an end of the edge closest to a point of intersection towards a point of intersection if the displacement does not generate a quadrilateral having at least one angle greater than a fixed angle threshold, and if the end has not already been displaced; otherwise
  displacing another end towards the point of intersection if the end has not already been displaced; and otherwise refining the mesh, until an end can be displaced, and then displacing the end.

33. A method according to claim 17, in which the medium comprises faults which are accounted for within the regular grid by performing the steps:
   determining a first edge of the grid, intersected by the open line, by scanning the open line, segment by segment, starting from one end of the open line;
   displacing an end of the edge closest to a point of intersection towards a point of intersection if the displacement does not generate a quadrilateral having at least one angle greater than a fixed angle threshold, and if the end has not already been displaced; otherwise
   displacing another end towards the point of intersection if the end has not already been displaced; and otherwise
   refining the mesh, until an end can be displaced, and then displacing the end.

34. A method according to claim 7, in which the mesh is refined by the following steps:
   a new node is added to the mesh corresponding to a point of intersection between a fault and an edge for which no end can be displaced;
   if the edge is vertical, a complete row of the grid containing the point of intersection is split, by adding a succession of horizontal edges, in all the quadrilaterals of the row with a succession of edges passing through the point of intersection; and
   if the edge is horizontal, a complete column of a grid containing a point of intersection is split, by adding a succession of vertical edges, in all quadrilaterals of the row wherein the succession of edges passes through the point of intersection.

35. A method according to claim 1, in which the regular grid is transformed into a three-dimensional gridded surface by carrying out the following steps:
   determining for each node not situated on a fault coordinates thereof by use of barycentric coordinates of the node in a reference frame defined by a triangle of a 2D triangulated surface to which it belongs;
   determining for each node situated on a fault coordinates thereof are by use of curvilinear abscissae measured on the fault; and
   establishing connectivities between the nodes to maximize quadrilaterals only when diagonals through which a fault passes are divided into two triangles.

36. A method according to claim 2, in which the regular grid is transformed into a three-dimensional gridded surface by carrying out the following steps:
   determining for each node not situated on a fault coordinates thereof by use of barycentric coordinates of the node in a reference frame defined by a triangle of a 2D triangulated surface to which it belongs;
   determining for each node situated on a fault coordinates thereof are by use of curvilinear abscissae measured on the fault; and
   establishing connectivities between the nodes to maximize quadrilaterals only when diagonals through which a fault passes are divided into two triangles.

37. A method according to claim 3, in which the regular grid is transformed into a three-dimensional gridded surface by carrying out the following steps:
   determining for each node not situated on a fault coordinates thereof by use of barycentric coordinates of the node in a reference frame defined by a triangle of a 2D triangulated surface to which it belongs;
   determining for each node situated on a fault coordinates thereof are by use of curvilinear abscissae measured on the fault; and
   establishing connectivities between the nodes to maximize quadrilaterals only when diagonals through which a fault passes are divided into two triangles.

38. A method according to claim 5, in which the regular grid is transformed into a three-dimensional gridded surface by carrying out the following steps:
   determining for each node not situated on a fault coordinates thereof by use of barycentric coordinates of the node in a reference frame defined by a triangle of a 2D triangulated surface to which it belongs;
   determining for each node situated on a fault coordinates thereof are by use of curvilinear abscissae measured on the fault; and
   establishing connectivities between the nodes to maximize quadrilaterals only when diagonals through which a fault passes are divided into two triangles.

39. A method according to claim 9, in which the regular grid is transformed into a three-dimensional gridded surface by carrying out the following steps:
   determining for each node not situated on a fault coordinates thereof by use of barycentric coordinates of the node in a reference frame defined by a triangle of a 2D triangulated surface to which it belongs;
   determining for each node situated on a fault coordinates thereof are by use of curvilinear abscissae measured on the fault; and
   establishing connectivities between the nodes to maximize quadrilaterals only when diagonals through which a fault passes are divided into two triangles.

40. A method according to claim 17, in which the regular grid is transformed into a three-dimensional gridded surface by carrying out the following steps:
   determining for each node not situated on a fault coordinates thereof by use of barycentric coordinates of the node in a reference frame defined by a triangle of a 2D triangulated surface to which it belongs;
   determining for each node situated on a fault coordinates thereof are by use of curvilinear abscissae measured on the fault; and
   establishing connectivities between the nodes to maximize quadrilaterals only when diagonals through which a fault passes are divided into two triangles.

41. A method according to claim 1, comprising exploiting a subterranean medium by generating a mesh of the medium of at least one flow simulation comprising software and defining an exploitation scheme for the medium using the at least one flow simulation and exploiting the medium using scheme.

42. A method according to claim 2, comprising exploiting a subterranean medium by generating a mesh of the medium of at least one flow simulation comprising software and defining an exploitation scheme for the medium using the at least one flow simulation and exploiting the medium using scheme.

43. A method according to claim 3, comprising exploiting a subterranean medium by generating a mesh of the medium of at least one flow simulation comprising software and defining an exploitation scheme for the medium using the at least one flow simulation and exploiting the medium using scheme.

44. A method according to claim 4, comprising exploiting a subterranean medium by generating a mesh of the medium of at least one flow simulation comprising software and defining an exploitation scheme for the medium using the at least one flow simulation and exploiting the medium using scheme.

45. A method according to claim 5, comprising exploiting a subterranean medium by generating a mesh of the medium of at least one flow simulation comprising software and defining an exploitation scheme for the medium using the at least one flow simulation and exploiting the medium using scheme.

46. A method according to claim 9, comprising exploiting a subterranean medium by generating a mesh of the medium of at least one flow simulation comprising software and defining an exploitation scheme for the medium using the at least one flow simulation and exploiting the medium using scheme.

47. A method according to claim 17, comprising exploiting a subterranean medium by generating a mesh of the medium of at least one flow simulation comprising software and defining an exploitation scheme for the medium using the at least one flow simulation and exploiting the medium using scheme.

* * * * *